April 16, 1935. M. G. PARKS Re. 19,536

METHOD OF MAKING AND APPLYING GASKETS TO JAR CAPS

Original Filed Dec. 4, 1930 3 Sheets-Sheet 1

Inventor:
Merritt G. Parks,
By Blindell, Parker, Coulson
Attys.

METHOD OF MAKING AND APPLYING GASKETS TO JAR CAPS

Original Filed Dec. 4, 1930 3 Sheets-Sheet 2

Inventor:
Merritt G. Parks,
By Blundell, Parker & Bacon
Attys.

April 16, 1935. M. G. PARKS Re. 19,536

METHOD OF MAKING AND APPLYING GASKETS TO JAR CAPS

Original Filed Dec. 4, 1930 3 Sheets-Sheet 3

Inventor:
Merritt G. Parks,
By Blundell, Parker & Carlson
Attys.

Reissued Apr. 16, 1935

Re. 19,536

UNITED STATES PATENT OFFICE 19,536

METHOD OF MAKING AND APPLYING GASKETS TO JAR CAPS

Merritt G. Parks, Dayton, Ohio, assignor to Crown Cork & Seal Company, Inc.

Original No. 1,899,524, dated February 28, 1933, Serial No. 499,908, December 4, 1930. Application for reissue February 20, 1934, Serial No. 712,260

13 Claims. (Cl. 113—80)

The invention relates generally to the manufacture of jar caps having plastic gaskets attached thereto, and more particularly it relates to a method of forming and applying such gaskets to the caps.

The primary object of the invention is to provide a new and improved method of making plastic gaskets, of such a character as to insure uniformity of size and shape even when produced in large quantities and at high production speeds.

Another object is to provide a new and improved method whereby gaskets of raw rubber or other, plastic material may be formed and applied to jar caps quickly and uniformly at a cost substantially lower than has heretofore been possible.

Another object is to provide such a method wherein the gasket is formed from an elongated strip or strand of material and applied in circular form to the cap so as to unite the ends of the strand and compress the material to the desired shape in adhering relation to the cap.

For the purpose of illustrating the practice of the present invention, I have illustrated in the accompanying drawings and will herein describe in detail a preferred form of apparatus adapted to utilize the new method, but it is to be understood that this apparatus is not to be taken as a limitation of the invention.

Figure 1:
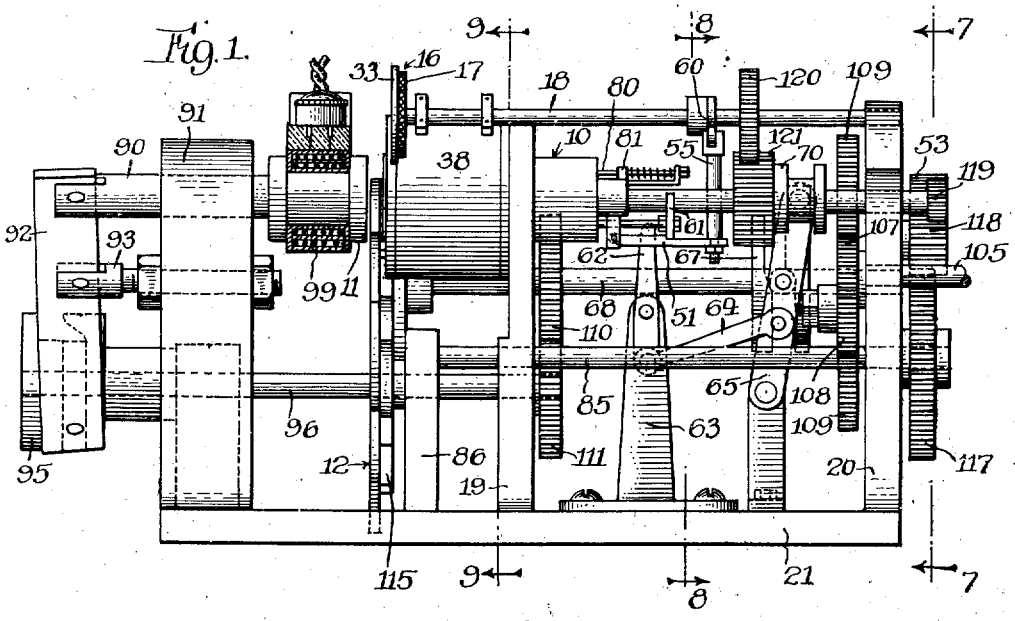
Fig. 1 is a fragmentary side elevational view of an apparatus adapted to utilize the invention.

In accordance with the preferred practice of the method, an elongated strand is formed from a heated mass of raw rubber or the like and is fed directly to a continuously operating machine which forms a succession of annular gaskets directly from the strand, and applies such gaskets to the jar caps. The formation of the gaskets from the strand is accomplished by arranging the end of the strand in a circle of a size suitable for a gasket, holding the remainder of the strand adjacent to the circularly formed portion and then severing this portion from the remainder of the strand. The circularly formed portion of the strand is then compressed against a jar cap and during such compression it is confined so as to limit its expansion in a radial direction whereby to insure uniformity of the gaskets. In the compression of the circularly formed portion of the strand, its opposed ends are united to form a continuous annular gasket adhering to the cap.

*The apparatus generally*

The apparatus shown herein comprises a strand forming machine 6 (Fig. 2), preferably in the form of an extruding device of well known construction, through the die 7 of which a continuous strand 8 of gasket material such as raw rubber may be discharged. As the strand 8 is formed, it is fed toward a gasket-forming and applying machine, which, generally considered, consists of a gasket-forming and applying device 10, supported in axial alinement with a reciprocable plunger 11. An indexing holder 12 operates to feed jar caps 14 one by one into a position between the plunger 11 and the forming and applying device 10 so that gaskets formed by the device may be pressed onto the caps 14 by coordinated approaching movements of the plunger and the device while the holder remains stationary.

*The gasket forming and applying mechanism*

In the machine shown herein, a strand 8 of gasket material, preferably of round cross section, is taken directly from the strand forming machine 6, and by a feeding mechanism 16 its end is placed in a circle forming means which forms the end portion of the strand 8 into an annulus suitable for use as a gasket. The annulus is then severed from the remainder of the strand and is pressed into position in a jar cap 14 in a manner such as to shape the gasket and unite the two abutting ends of the severed strand while maintaining the thickness and dimensions of the gasket substantially uniform at all points thereof.

The feeding means and the circle forming means are in the present case, both rotatable in character and are arranged to act in succession to draw the end portion of the strand over the desired path to form the annulus. Considered generally, the feeding means preferably comprises a disk 17 (Figs. 1, 6, 9, 11, and 12) fixed on a shaft 18 mounted in standards 19 and 20 of the frame 21 and carrying a releasable feed clamp 22 (Figs. 6, 11, and 12) for grasping and moving the end of the strand 8. As indicated by the arrow in Fig. 6, the feed clamp 22 on the disk 17 moves the end of the strand 8 along the adjacent periphery of an oppositely rotating coaxial mandrel 23, which in the present case constitutes a part of the circle forming means. This feeding of the strand by the disk 17 continues until the strand is within the range of a clamp 24 (Fig. 6) carried by the winding mandrel. After automatic operation of the clamp 24 so as to grasp the strand 8, the feed clamp 22 is released so that continued rotation of the mandrel 23 may draw the strand into circular form about the mandrel.

Figure 6:
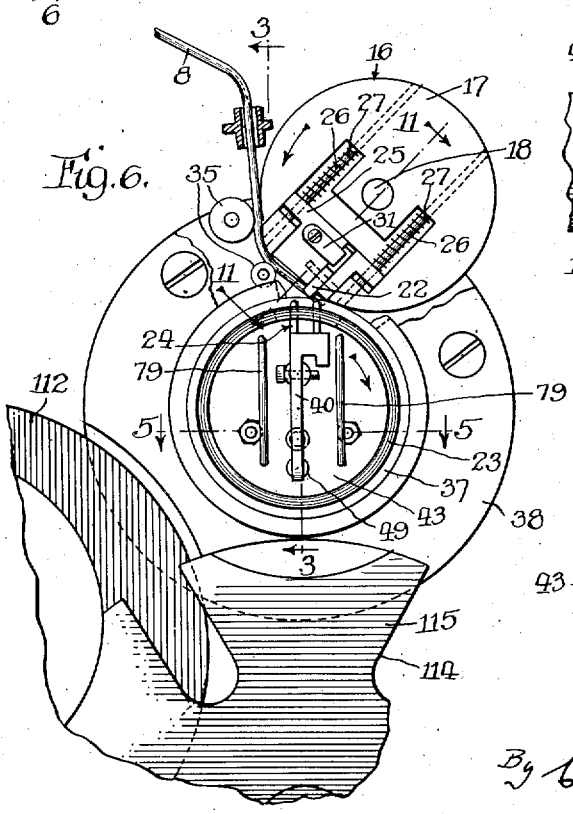
Fig. 6 is an end elevational view taken through the machine along the line 6—6 of Fig. 3 with certain parts of the machine removed.
Figure 10:
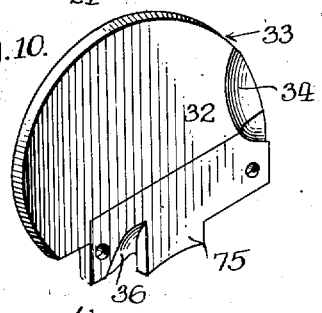
Fig. 10 is a perspective view of the knife employed to sever the strand of gasket material, the knife being shown in its assembled position wherein it forms a part of a cam plate.
Figure 11:
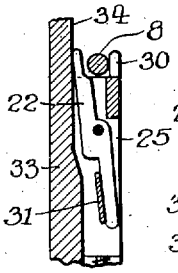
Figs. 11 and 12 are similar sectional views taken along the line 11—11 of Fig. 6 and showing the feeding clamp in its open and closed positions respectively.
Figure 12:
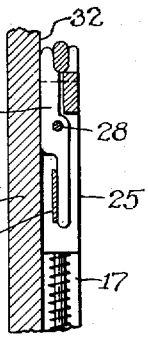

In order that the end of the strand 8 may be held close to the mandrel 23 and within the range of its clamp 24 as it is fed by the disk 17, the feed clamp 22 is carried on a slide 25 which is movable radially of the disk 17 as shown in Fig. 6 on rods 26, and is pressed radially outwardly of the disk 17 by springs 27 surrounding the rods 26. The clamp 22 is best shown in Figs. 11 and 12 and is in the form of a lever extending radially with respect to the disk 17 and pivoted at 28 upon the slide 25 so that its outer end is in opposed relation to a stationary finger 30 carried by the slide and forming the other member of the clamp. The clamp 22 is normally pressed to its open position, shown in Fig. 11, by a spring 31 acting on one end thereof, and is closed by movement of the opposite end of the clamp along a cam surface 32 formed on a stationary plate 33 (Figs. 1, 2 and 10) which in the present case, is in the form of a disk mounted on the frame of the machine at one side of the feed disk 17.

Figure 2:
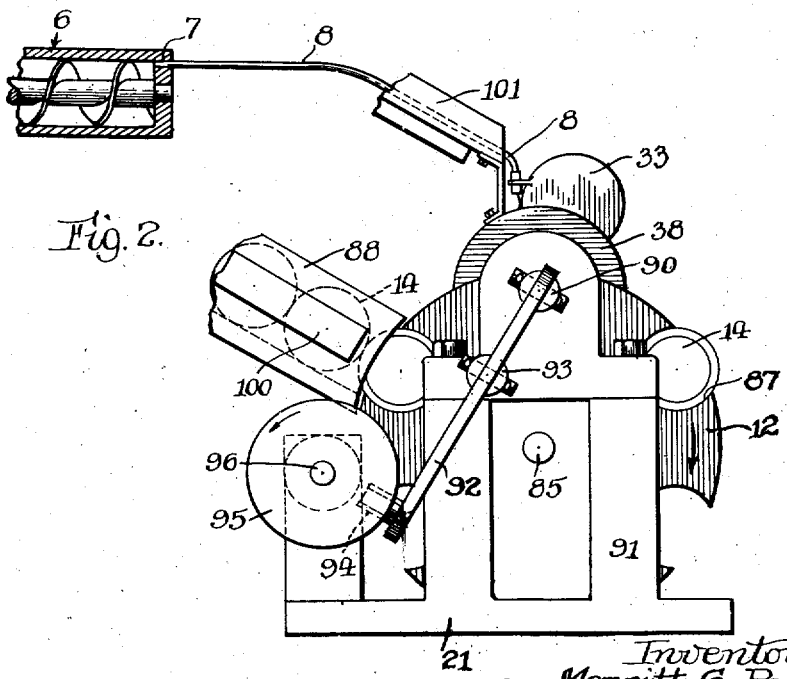
Fig. 2 is an end elevational view showing the left hand end of the apparatus illustrated in Fig. 1.

Rotational movement imparted to the disk 17 moves the feed clamp 22 toward the end of the strand 8 (Fig. 6) and the cutaway portion 34 of the cam surface 32 (Fig. 10) along which the clamp moves, permits the clamp to be opened by the spring 31. A detailed view of the cam plate 33 is shown in Fig. 10, which is taken from the far side of the plate as shown in Fig. 2. This view shows the formation of the various cam surfaces. By the action of the springs 27, the clamp 22 is held in its outward radial position until the two opposed members 30 and 22 are positioned on opposite sides of the strand 8. To insure proper positioning of the strand, guide rollers 35 are positioned in opposed relation to the feed disk 17 and the clamp 22 is arranged to grasp the strand between the two guide rollers 35. The action of the cam surface 32 along which the clamp 22 moves causes the clamp to be closed until it has passed to a second cutaway portion 36 (Fig. 10) of the cam surface 32 which permits the clamp to open.

The mandrel 23 is mounted within a sleeve 37 for rotation therewith, the sleeve being rotatably mounted in a bearing head 38 of the frame 21. One end of the mandrel 23 (the left in Fig. 3) normally projects from the end of the sleeve 37 to provide a surface about which the strand 8 may be wound, and the clamp 24 is arranged to operate by pressing the strand against the end of the sleeve 37.

Figure 3:
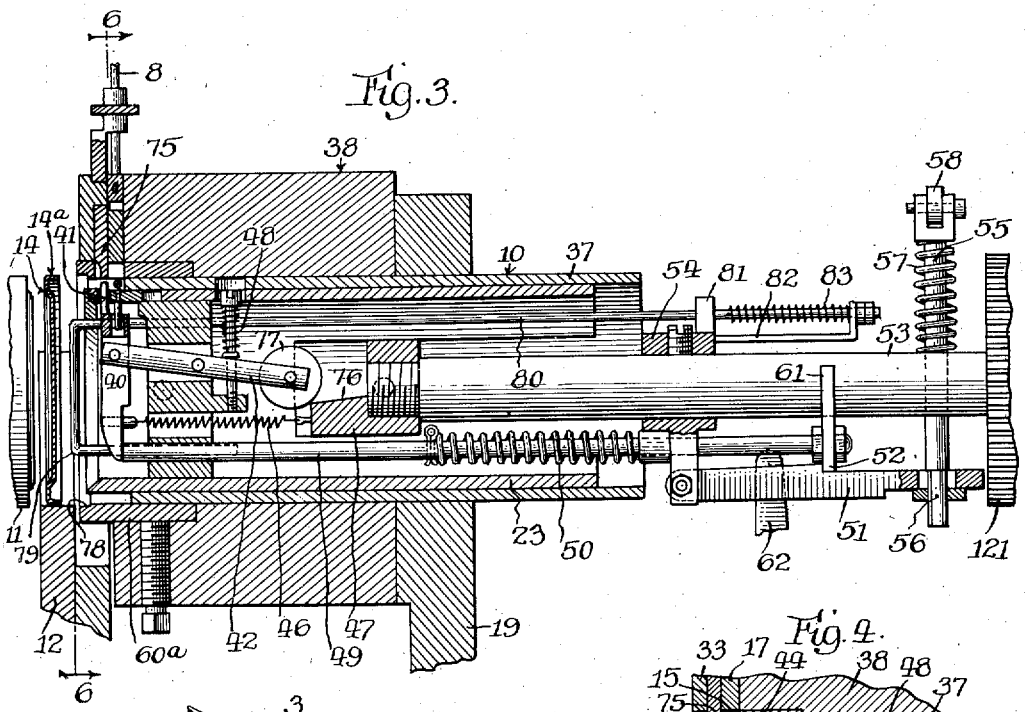
Fig. 3 is a fragmentary vertical sectional view taken through the gasket forming and applying means substantially along the line 3—3 of Fig. 6.
Figure 4:
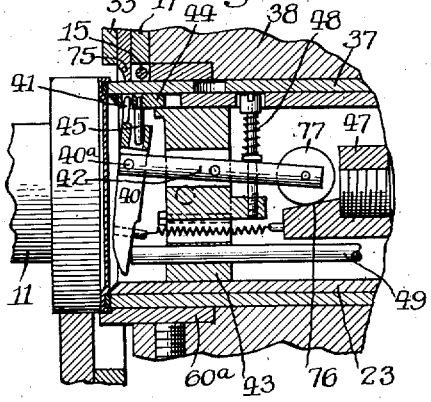
Fig. 4 is a fragmental view similar to Fig. 3 showing the parts in the positions occupied upon the completion of the gasket applying operation.

The clamp 24 is preferably mounted principally within the mandrel 23, which is of sleeve-like form to provide space for the clamp and its operating parts, and as shown herein the clamp comprises a movable member in the form of a lever 40 extending diametrically of the mandrel (Figs. 3, 4 and 6). One end of the lever 40 has a pair of spaced clamping fingers 41 formed thereon adapted to project through the mandrel 23 and upon pivotal movement of the lever 40, to press the strand 8 longitudinally of the mandrel into contact with the end of the sleeve 37.

The clamping lever 40 is pivoted at 40a intermediate its ends on one end of a lever 42, which for purposes which will hereinafter appear, extends longitudinally through and is pivoted to a transverse wall 43 in the mandrel. Thus by pivotal movement of the lever 40 about its pivot 40a, the clamp is operated, and in the present case the clamping fingers 41 project through a plate 44 which is longitudinally slidable in the mandrel and which insures an unbroken surface in the mandrel at the point where the strand is wound. The clamping lever 40 is normally held in its open position by a spring 46 (Fig. 3) extending through the wall 43 and connected to the lever 40 and to a cross head 47 which is fixed to the outer sleeve 37 in a manner which will later appear.

To pivot the clamping lever 40 to its operative position at the desired point in the rotating movement of the mandrel 23, a rod 49 is employed which is slidable longitudinally through the wall 43 and into contact with the inner end of the lever 40. A spring 50 acting on the rod 49 normally presses the rod toward the lever 40 but its movement is restrained by a trigger 51 (Figs. 1 and 3) engaging an abutment 52 on the rod and arranged to be released at a predetermined point in the rotative movement of the mandrel. A shaft 53 connected to the cross head 47 and serving to rotate the mandrel, also serves to support the trigger 51 through the medium of a collar 54 fixed on the shaft. The trigger 51, which is pivoted on the collar 54 extends longitudinally of the shaft 53 and is operated by a plunger 55 which projects diametrically through the shaft 53.

One end of the plunger 55 is connected to the trigger 51 so as to transmit movement thereto in two directions as shown at 56 (Fig. 3), and the trigger is moved toward its operative position by a spring 57 surrounding the other end of the plunger and acting between the plunger and the shaft 53.

Figure 8:
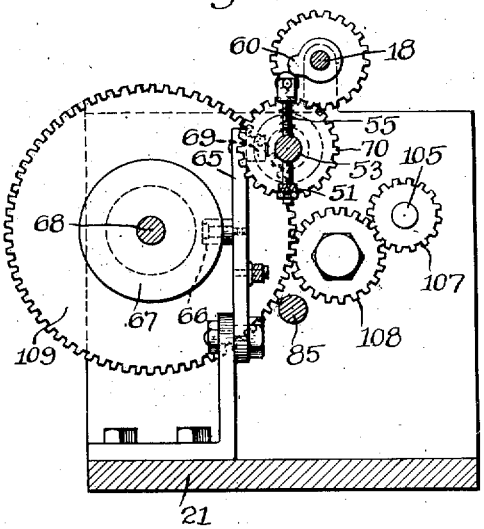
Fig. 8 is a vertical sectional view taken through the machine along the line 8—8 of Fig. 1, looking in the direction of the arrows.

In the opposite rotation of feed disk 17 and the mandrel 23, the trigger 51 is released at the proper time by contact of a roller 58 on the end of the plunger with a cam 60 (Figs. 1 and 8) mounted on the shaft 18.

As the mandrel rotates, it draws the end of the strand 8 into the longitudinally opening annular channel formed between the mandrel 23, the end of the sleeve 37 and an annular sleeve 60a which forms a part of the bearing 38, and by the action of the sides of this channel, the annular portion of the strand is maintained in the desired form.

Means is provided for automatically returning the rod 49 to the position shown in Fig. 3 after the rotative movement of the mandrel has been completed so as to permit the clamp 24 to be opened by its spring 46.

As shown in Figs. 1 and 3, this means comprises a plate 61 fixed on the rod 49 so as to be engaged by the end of a movable lever 62 to withdraw the rod to a position wherein the abutment 52 is behind the shoulder of the trigger 51. The lever 62 is mounted on a bracket 63 (Fig. 1) and is actuated through a link 64 connected to a similarly pivoted lever 65. The lever 65 carries a cam roller 66 engaging a grooved cam 67 fixed on a shaft 68 which rotates in timed relation to the rotative movement of the mandrel 23.

The sleeve 37 is utilized to move the gasket along the mandrel 23 and to press it into position on the cap 14, and for this purpose the mounting of the sleeve in the bearing 38 is arranged to permit longitudinal movement of the sleeve. Such movement is obtained through a roller 69, (Fig. 8) mounted on the lever 65 and engaging a grooved collar 70 fixed on the mandrel shaft 53. In such movement of the sleeve 37, the mandrel 23 moves therewith until the end of the mandrel 23 strikes the cap 14 which is backed up by the plunger 11 and thereafter the sleeve continues its movement independently of the mandrel. Such relative movement is permitted by a yielding lost motion connection, best shown in Fig. 5 of the drawings, wherein it will be seen that cross head 47 extends through longitudinal slots 71 formed in the mandrel 23. The mandrel 23 is normally projected longitudinally from the end of the sleeve 37 by springs 72 acting between the cross head 47 and the transverse wall 43 of the mandrel, the springs 72 being mounted about rods 73 which extend through the cross head 47 and the wall 43 and have heads thereon which limit the movement of the parts by the springs 72.

During the initial part of the advancing movement of the sleeve 37, the annulus formed from the strand 8 is severed from the remainder of the strand by a knife 75 (Figs. 3, 4 and 10) positioned closely adjacent to the upper surface of the sleeve 37 (Figs. 3 and 4) and acting as a shearing edge past which the annulus is forced by the sleeve 37. The portion of the strand 8 which is held by the feed clamp 22 extends along the face of the knife at an angle to the cutting edge of the knife and since this portion cannot pass the knife 75, it will be apparent that the annular portion of the strand which is being moved by the sleeve 37, will be sheared from the held portion of the strand so as to leave angularly disposed ends on both portions of the strand. It will be noted that in the present case the knife is secured on the stationary plate 33 (Fig. 3) and the body of the knife, therefore, forms a part of the cam surfaces 32, 34, and 36 (Fig. 10).

Since the sleeve 37 must move longitudinally of the mandrel to press the strand onto the cap 14, the clamping fingers 41 of the lever 40 are arranged to slide radially through the plate 44, into an out-of-the-way position shown in Fig. 4, and in such movement the lever 40 is guided by a pin 45 projecting radially inwardly from the plate 44 and loosely engaging an opening in the lever. The withdrawing movement of the lever 40 is obtained by pivotal movement of the lever 42 upon which the lever 40 is mounted, against the action of a spring 48 which normally tends to move the lever 42 so as to project the fingers 41 outwardly of the mandrel to the position shown in Figs. 3 and 6.

After the pointed end edge of the mandrel 23 has moved into abutment with the cap 14, the continued movement of the cross head 47 serves to withdraw the fingers 41 of the clamp 24 radially into the mandrel. This is accomplished by a cam 76 formed on the cross head 47 and arranged to engage a cam roller 77 on the adjacent end of the lever 42 to move the lever against the force of the spring 48 to the position shown in Fig. 4. Thus, the path of the sleeve 37 is cleared and its movement is continued until the annulus is pressed within the flange 14a of the cap 14. The mandrel 23 provides an internal support for the gasket from the time it is formed until it is applied to the cap, thus insuring the gasket maintaining its preformed shape while being bodily moved by the sleeves 37 from the mandrel to within the cap.

It will be noted that the advancing movement of the plunger 11 presses the cap 14 positively toward the yielding mandrel 23 until the flange 14a of the cap is positioned within and is laterally supported by the sides of an annular recess 78 formed in the outer end of the collar 60a (Figs. 3 and 4), and while it is thus held the annulus is compressed to rectangular cross sectional form between the cap 14, its flange 14a, the mandrel 23 and the end of the sleeve 37. It will be seen that the annular recess 78 provides an annular space in which the flange 14a may be placed with its inner surface alined with the inner surface of the collar 60a, and the compressing action of the sleeve 37 widens the strand 8 to fill the space between the flange 14a and the mandrel 23. Such compression serves effectively to join the adjacent, angularly cut ends of the strands, and a continuous annular gasket is thereby formed having substantially the same thickness and width at all points thereof. The ends of the gasket may be tapered or inclined so that when the gasket is applied to the cap, the abutting ends will overlap along an inclined line that cuts or intersects the inner and outer circumferences of the gasket. In other words, the line of cleavage is at an angle to a radius of the arc of the gasket in order to form a joint of the same uniform dimensions as the intermediate or remaining portion of the gasket.

To remove the cap 14 from the recess 78 upon completion of the attaching operation, a pair of U-shaped rods 79 are mounted in the transverse wall 43 (Figs. 3, 4 and 6), with their cross members disposed on opposite sides of the axis of the mandrel 23 and adjacent the clamp 24. One side member 80 of each rod 79 extends longitudinally through the mandrel 23 and out of the other end thereof (Fig. 3), and both are guided in ears 81 on the collar 54. Extending from the collar is a bracket 82 between which and the rods 79 a pair of springs 83 are arranged to act to press the rods toward the cap 14 positioned at the other end of the mandrel.

Thus, when the plunger 11 is withdrawn, the rods 79 push the cap 14 away from the mandrel 23 and into the indexing holder 12 so that the finished cap will be moved out of the machine as a new cap is moved into position.

In the withdrawing movement of the sleeve 37, the mandrel resumes its normal position shown in Figs. 3 and 6, and the fingers 41 of the clamp 24 are projected through the mandrel so as to be ready for the next clamping operation.

*The indexing cap holder*

Figure 9:
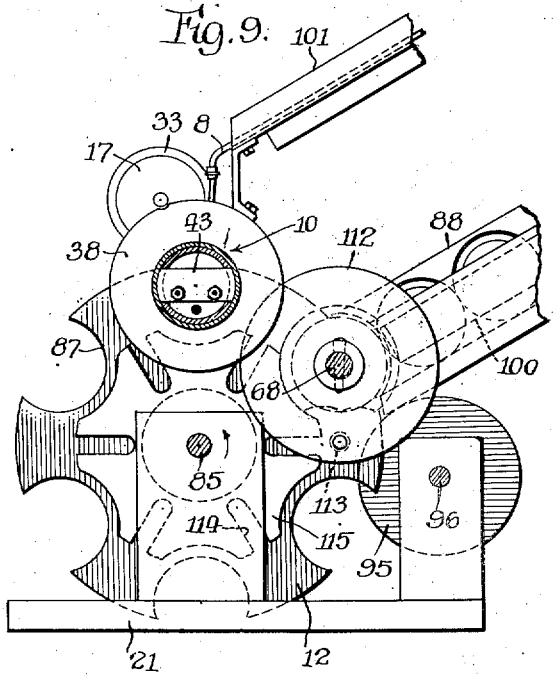
Fig. 9 is a vertical sectional view taken along the line 9—9 of Fig. 1, looking in the direction of the arrows.

The indexing holder 12 is best shown in Figs. 1, 2, and 9 and comprises a disk of substantial thickness mounted on the overhanging end of a shaft 85 mounted in the bracket 86 (Fig. 1) beneath the forming device 10 and extending through the standard 19 of the frame. At equally spaced points about its periphery, the disk 12 has a plurality of segmental pockets 87 formed therein opening outwardly of the disk and of sufficient width to permit a cap 14 to enter edgewise thereinto. The disk 12 is moved intermittently to position the pockets 87 successively between the mandrel 23 and the plunger 11, the uppermost pocket on the disk being the one which is positioned adjacent the mandrel. As shown in Fig. 9, the disk 12 is moved in a counterclockwise direction, and the caps 14 are fed to the pockets 87 of the disk through an inclined chute 88 which discharges a vertically positioned cap 14 into each pocket just before it reaches the uppermost position. It will be seen that the open lower end of the chute 88 is located opposite a position in which the pockets 87 are stopped in the intermittent movement of the disk, so that ample opportunity is provided for the lower cap 14 to move into the pocket.

After a gasket has been applied to the cap 14 opposite the mandrel, that cap is moved by the holder 12 toward the left side of the machine (Fig. 9) and is dropped from its pocket 87.

*The plunger 11 and its mounting*

The reciprocating plunger 11 is mounted on one end of a shaft 90 (Figs. 1 and 2) which is slidable through a standard 91 of the frame and is actuated by a lever 92 pivoted at one end to the other end of the shaft 90. Intermediate its ends, the lever 92 is pivoted on an adjustable support 93 carried by the standard 91, while at its other end it carries a roller 94 engaging a grooved cam 95 mounted on the end of a constantly rotating shaft 96. By adjusting the support 93, the stroke of the plunger 11 may be adjusted to bring the cap 14 accurately to the desired position.

If desired, the plunger 11, as well as the chute 88 may be heated by suitable electric heaters 99 and 100 and the strand 15 may be drawn from the forming machine 6 through an electrically heated guideway 101 (Figs. 2 and 9) so as to render the strand more easily workable and insure firm adherence of the gasket to the caps. In other words, each cap 14 as it is moved into the gasket applying position is sufficiently heated to insure the gasket when applied under pressure to be pressed to the desired conformation and adhere to the cap.

*The driving mechanism*

Figure 7:
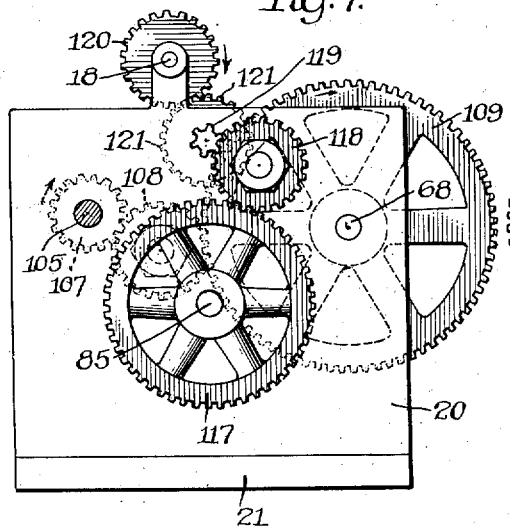
Fig. 7 is a vertical sectional view taken along the line 7—7 of Fig. 1, looking in the direction of the arrows.

All of the parts of the machine are preferably driven in timed relation to each other from a single power source (not shown) arranged to rotate a horizontal shaft 105 which is mounted in the standard 20 and extends through the standard 19. On its end adjacent the standard 19, the shaft 105 carries a gear 107 which, through an idler 108, (Figs. 1, 7, and 8) drives a gear 109 fixed on the shaft 68.

The shaft 68 is rotated once for each gasket forming operation and drives the shaft 96 at the same rate through gears 110 and 111 (Fig. 1) whereby to reciprocate the plunger 11 once for each revolution of the shaft 68, it being understood that the cam 95 has but a single lobe.

The constantly rotating shaft 68 also drives the indexing work holder 12, through the medium of a Geneva movement, having a disk 112 fixed to the shaft 68, with a pin 113 (Fig. 9) adapted to engage radial slots 114 in a Geneva wheel 115 which is fixed on the shaft 85 of the work holder. The number of slots 114 in the Geneva wheel 115 corresponds to the number of cap-receiving pockets 87 so that each rotation of the shaft 68 moves a new pocket 87 into position opposite the mandrel 23.

The desired intermittent rotary movement of the feed disk 17 and the mandrel 23 is preferably obtained from the shaft 85 upon which the indexing holder 12 is mounted. To this end the shaft 85 is extended through the standard 20 and carries a gear 117 (Figs. 1 and 7) which through an idler 118 drives a gear 119 on the shaft 53. The idler 118 is preferably made wide enough to permit longitudinal movement of the shaft 53 in the gasket applying operation.

The gears 117, 118 and 119 are proportioned to impart one complete revolution to the mandrel 23 during each advancing movement of the work holder 12, and it will be seen that this rotation of the mandrel takes place while the movement of work holder is taking place.

The feed disk 17 is oppositely rotated in timed relation to and at the same speed as the shaft 53 by meshing gears 120 and 121 fixed respectively on the two shafts, and the gear 121 is made of sufficient thickness to maintain the two gears in mesh during longitudinal movement of the shaft 53.

*Operation*

A strand 8 of pre-formed gasket material, preferably of round cross section, is fed from a strand forming machine 6 through the chute 101 to the guide rollers 35 adjacent the intermittently rotating feed disk 17. In the rotation of the disk 17, the clamp 22 carried thereby is opened, and as the clamp passes the guide rollers 35, it is closed so as to grasp the strand and draw it toward the adjacent periphery of the oppositely rotating mandrel 23.

The normal stopped position of the feed disk 17 is such that the end of the strand 8 is adjacent to the mandrel 23 as shown in Fig. 6, while the fingers 41 of the clamp 24 project through the mandrel adjacent to the end of the strand. When opposite rotation of the feed disk 17 and the mandrel is started, the clamp 22 moves across the adjacent periphery of the mandrel, and due to outward radial movement of the clamp 22 by the springs 27, the end of the strand is held close to the mandrel 23 for an appreciable distance. During such movement of the strand 8, its end is automatically secured to the mandrel 23 by the finger 41 of the clamp 24 which presses the strand against the adjacent end of the sleeve 37.

It will be recalled that the clamp 24 is normally projected through the mandrel 23 by the spring 48, and is held in its unclamped position by the spring 46, and its automatic clamping movement is obtained through the action of a cam 60 upon the plunger 55 which releases the trigger 51 (Fig. 3) and permits the spring pressed rod 49 to strike and actuate the lever 40.

After the clamp 24 has been closed, the cut away section 36 of the cam surface 32 permits the clamp 22 to be opened so as to release the strand from the feed disk 17 and permit it to be drawn by the clamp 24 into a circle in the space between the mandrel 23, the collar 60a and the sleeve 37.

Just prior to the completion of a full revolution by the mandrel 23, the clamp 22, which is then open, is actuated by movement across the cam surfaces 34, 32, so as to clamp the strand 8 to the feed disk 17 which holds the strand 8 while it is severed from the annulus formed about the mandrel.

The strand 8 is severed by advancing movement of the sleeve 37 which acts as a shearing member in cooperation with the knife 75 to cut the strand at an angle close to the clamp 22 which is then stationary.

As the sleeve 37 advances, (to the left in Fig. 6) the clamp 24 is opened by withdrawal of its actuating rod 49, to a position wherein it is held by the trigger 51, this being accomplished by the lever 62 (Fig. 1) operated from the lever 65 which reciprocates the sleeve 37. At substantially the same time, the projecting fingers 41 of the clamp 24 are drawn radially inwardly of the mandrel by the action of the cam 76 which moves with the sleeve 37 and acts to rock the lever 42 upon which the clamp 24 is mounted.

During such advancing movement of the sleeve 37, the mandrel 23 moves longitudinally with the sleeve by reason of the springs 72 (Fig. 5) and approaches the cap 14 which is then being advanced toward the mandrel by movement of the plunger 11. While the cap 14 is being positioned by the cooperative action of the plunger 11 and the mandrel 23 and the recess 78, the advancing movement of the sleeve 37 continues, and after the positioning of the cap is completed the annular strand is compressed onto the cap into rectangular cross sectional form with united ends, as shown in Fig. 4.

The withdrawing movement of the plunger 11 and the sleeve 37 then takes place, and the finished cap is moved back into the pocket 87 of the indexing holder 12 by the action of the spring pressed rods 79, the springs 83 of which have been compressed during the gasket applying operation.

Figure 5:
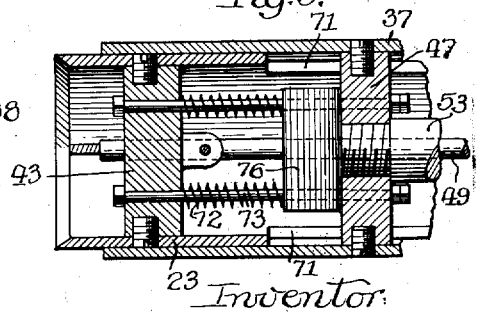
Fig. 5 is a fragmental plan view taken in section along the line 5—5 of Fig. 6.

As the sleeve 37 is withdrawn, the springs 72 move the mandrel 23 to the left relatively to the sleeve, so that the end of the mandrel projects from the sleeve as shown in Figs. 3 and 5. This relative movement withdraws the cam 76 and permits the spring 48 to project the clamping fingers 41 outwardly through the mandrel.

The mechanism is then conditioned for another rotative movement to form another annulus from the strand 8, and such movement occurs automatically due to the driving connection between indexing holder 12 and the strand feeding and circle forming devices.

During such rotative movement of the mandrel to form another annulus, the work holder 12 moves the finished cap 14 out of the machine and advances another cap from the chute 88 to a position between the mandrel and the plunger 11, so that the annulus may be pressed thereon in the next reciprocation of the sleeve 37.

From the foregoing it will be apparent that the invention provides an improved gasket capable of accurate formation at high production speeds.

It will also be clear that the invention provides an advantageous method of forming and applying gaskets to jar caps whereby a uniformity of the product is insured. It will also be seen that the method is adapted for performance at high speeds.

I claim:—

1. The method of forming and applying plastic gaskets to jar caps which consists in forming a strand of raw rubber composition material, forming the end of the strand into a circle, severing the circularly formed portion of the strand from the remainder thereof, holding the end of the remainder of the strand during and after the severing operation, and compressing said portion against a jar cap to unite the ends of said portion and affix it to the cap while confining said portion to limit the radial width to which it may be expanded by such compression.

2. The method of forming annular gaskets or the like which consists in extruding a continuous strand from a heated mass of raw rubber composition material, and forming said strand into a succession of circles severed from each other and each having opposed ends, and uniting the ends of each circle while maintaining the material in a heated condition.

3. The method of forming and applying plastic gaskets to jar caps which consists in compressing a circularly arranged strand of gasket material of round cross-section and with opposed ends onto a cap to form a gasket of rectangular cross-section with the adjacent ends of the strand joined.

4. The method of forming and applying plastic gaskets to jar caps which consists in drawing the end of a strand of raw rubber composition material through an annular channel recess to form a circle from said strand confined by said recess, severing the circularly formed portion of the strand from the remainder of the strand, placing a jar cap in closing relation to said recess, and moving said circularly arranged strand through the recess to compress the strand onto the cap to form a continuous annular gasket.

5. The method of forming and applying gaskets to caps or the like which consists in providing a strand of gasket material, shaping the end portion of the strand into a preformed gasket by movement of the strand lengthwise along a line corresponding to the configuration of the gasket to be formed, internally supporting the preformed gasket, and pressing the gasket into a heated cap, whereby to cause the gasket to adhere to the cap.

6. The method of forming and applying gaskets to jar caps or the like which consists in providing a strand of compressible gasket material, shaping the end portion of the strand into substantially circular form by moving the same lengthwise around a predetermined center, internally supporting the circularly formed portion and while it is internally supported directly pressing the same into a cap under pressure sufficient to cause the same to retain the circular shape and heating the cap to cause the gasket to adhere thereto.

7. The method of forming and applying gaskets to jar caps or the like which consists in providing a strand of compressible gasket material, shaping the end portion of the strand into substantially circular form by moving the same lengthwise around a predetermined center, supporting the circular formed portion and while it is supported directly pressing the same into a cap under pressure sufficient to cause the same to be brought to the desired shape and to adhere to the cap while maintaining the cap heated, whereby to cause the gasket to adhere to the cap.

8. The method of forming and applying gaskets to jar caps or the like which consists in providing a strand of compressible gasket material, shaping the end portion of the strand into substantially circular form by drawing the strand and moving the same lengthwise around a predetermined center, internally supporting the circularly formed portion and while it is internally supported directly pressing the same into a cap under pressure sufficient to cause the same to be distorted to the desired shape and to adhere to the cap, while maintaining the cap heated whereby to cause the gasket to adhere to the cap.

9. The method of forming and applying gaskets to caps or the like which consists in providing a strand of gasket material, shaping the end portion of the strand into a preformed gasket by movement of the strand lengthwise along a line corresponding to the configuration of the gasket to be formed, internally supporting the preformed gasket from the time it is formed substantially until it is applied to a cap, positioning the cap with its inner surface to receive the preformed gasket wholly within the marginal edge thereof, and moving the preformed gasket against the inner surface of the cap.

10. The method of forming and applying gaskets to jar caps or the like which consists in providing a strand of compressible gasket material, shaping the end portion of the strand into a substantially circular form by movement of the strand lengthwise around a predetermined center, internally supporting the circularly formed portion from the time it is formed substantially until it is applied to a cap, positioning the cap with its inner surface to receive the preformed gasket wholly within the marginal edge thereof, and moving the preformed gasket against the inner surface of the cap with sufficient pressure to cause the gasket to adhere to said surface.

11. The method of forming and applying gaskets to jar caps or the like which consists in providing a strand of compressible gasket material, shaping the end portion of the strand into a substantially circular form by movement of the strand lengthwise around a predetermined center, internally supporting the circularly formed portion from the time it is formed substantially until it is applied to a cap, severing the circularly formed portion from the remainder of the strand, positioning the cap with its inner surface to receive the preformed gasket wholly within the marginal edge thereof, and moving the preformed gasket against the inner surface of the cap with sufficient pressure to cause the gasket to adhere to said surface.

12. The method of forming and applying gaskets to caps or the like which consists in providing a strand of gasket material, shaping the end portion of the strand into a preformed gasket by movement of the strand lengthwise along a line corresponding to the configuration of the gasket to be formed, and moving the preformed gasket into a cap against the inner surface of the top thereof and wholly within the marginal edge of the cap under sufficient pressure to cause the gasket to adhere to the cap.

13. The method of forming and applying gaskets to caps or the like which consists in providing a strand of gasket material, shaping the end portion of the strand into a preformed gasket by movement of the strand lengthwise along a line corresponding to the configuration of the gasket to be formed, and moving the gasket into a cap against the inner surface of the top thereof and wholly within the marginal edge of the cap while maintaining the shape of the preformed gasket and under sufficient pressure to cause the gasket to adhere to said surface.

MERRITT G. PARKS.